(12) United States Patent
Schwandt et al.

(10) Patent No.: US 7,674,425 B2
(45) Date of Patent: Mar. 9, 2010

(54) VARIABLE COALESCER

(75) Inventors: Brian W. Schwandt, Fort Atkinson, WI (US); Christopher E. Holm, Madison, WI (US); Tadeusz Jaroszczyk, Stoughton, WI (US); Eric A. Janikowski, Jefferson, WI (US); Kwok-Lam Ng, Madison, WI (US); Barry M. Verdegan, Stoughton, WI (US); Roger L. Zoch, McFarland, WI (US); Leon Gradoń, Warsaw (PL); Jacek Bodasiński, Warsaw (PL); Witalis Rumiński, Warsaw (PL); William C. Haberkamp, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 1135 days.

(21) Appl. No.: 11/273,101

(22) Filed: Nov. 14, 2005

(65) Prior Publication Data

US 2007/0107399 A1    May 17, 2007

(51) Int. Cl.
*B29C 47/00* (2006.01)
*B01D 46/00* (2006.01)

(52) U.S. Cl. ............... 264/555; 55/527; 55/487; 55/DIG. 5; 264/167; 264/211.12; 264/211.14

(58) Field of Classification Search ............ 55/528, 55/527, 487; 210/500.1, 502.1; 428/32, 428/364, 395; 264/555, 167, 211.12, 211.14
See application file for complete search history.

(56) References Cited

U.S. PATENT DOCUMENTS

| | | | |
|---|---|---|---|
| 3,645,398 A | 2/1972 | Flocco | |
| 3,755,527 A | 8/1973 | Keller | |
| 3,801,400 A | 4/1974 | Vogt et al. | |
| 3,841,953 A | 10/1974 | Lohkamp et al. | |
| 3,904,798 A * | 9/1975 | Vogt et al. | 428/36.3 |
| 3,933,557 A | 1/1976 | Pall | |
| 3,938,973 A * | 2/1976 | Kershaw | 55/501 |
| 3,949,130 A | 4/1976 | Sabee et al. | |
| 3,971,373 A | 7/1976 | Braun | |
| 3,972,759 A | 8/1976 | Buntin | |
| 3,978,185 A | 8/1976 | Buntin et al. | |
| 4,048,364 A | 9/1977 | Harding et al. | |
| 4,078,124 A | 3/1978 | Prentice | |
| 4,116,738 A | 9/1978 | Pall | |

(Continued)

FOREIGN PATENT DOCUMENTS

EP    0325854    4/1993

(Continued)

OTHER PUBLICATIONS

S. F. Moses and K. M. Ng, *"A Visual Study of the Breakdown of Emulsions in Porous Coalescers"*, Chemical Engineering Science, vol. 40, No. 12; pp. 2339-2350, 1985.

(Continued)

*Primary Examiner*—Duane Smith
*Assistant Examiner*—Ives Wu
(74) *Attorney, Agent, or Firm*—Andrus, Sceales, Starke & Sawall, LLP (57) ABSTRACT

A coalescer has variable characteristics including variable diameter of individual fibers along their length such that an individual fiber has differing diameters at different points along its length, and including variable porosity.

6 Claims, 2 Drawing Sheets

U.S. PATENT DOCUMENTS

| | | | |
|---|---|---|---|
| 4,192,919 A | | 3/1980 | Raghavachari |
| 4,253,954 A | | 3/1981 | Midkiff et al. |
| 4,282,097 A | | 8/1981 | Kuepper et al. |
| 4,416,782 A | | 11/1983 | Kerres |
| 4,524,000 A | | 6/1985 | Clayfield et al. |
| 4,594,202 A | | 6/1986 | Pall et al. |
| 4,668,393 A | | 5/1987 | Stone |
| 4,689,058 A | | 8/1987 | Vogt et al. |
| 4,726,901 A | * | 2/1988 | Pall et al. .................... 210/496 |
| 4,859,348 A | | 8/1989 | Jusaitis et al. |
| 4,874,339 A | | 10/1989 | Bratz |
| 4,878,929 A | | 11/1989 | Tofsland et al. |
| 4,892,667 A | | 1/1990 | Parker, III et al. |
| 4,995,974 A | | 2/1991 | Lorey et al. |
| 5,061,170 A | | 10/1991 | Allen et al. |
| 5,075,068 A | | 12/1991 | Milligan et al. |
| 5,122,048 A | | 6/1992 | Deeds |
| 5,145,689 A | | 9/1992 | Allen et al. |
| 5,174,907 A | | 12/1992 | Chown et al. |
| 5,227,172 A | | 7/1993 | Deeds |
| 5,236,641 A | | 8/1993 | Allen et al. |
| 5,254,297 A | | 10/1993 | Deeds |
| 5,269,670 A | | 12/1993 | Allen et al. |
| 5,273,565 A | | 12/1993 | Milligan et al. |
| 5,296,061 A | * | 3/1994 | Ando et al. ................. 156/62.2 |
| 5,306,321 A | | 4/1994 | Osendorf |
| 5,340,479 A | | 8/1994 | Szczepanski et al. |
| 5,401,458 A | | 3/1995 | Wadsworth et al. |
| 5,409,642 A | | 4/1995 | Allen et al. |
| 5,411,576 A | | 5/1995 | Jones et al. |
| 5,419,953 A | | 5/1995 | Chapman |
| 5,427,597 A | | 6/1995 | Osendorf |
| 5,454,848 A | * | 10/1995 | Miller ......................... 65/442 |
| 5,470,663 A | | 11/1995 | Wadsworth et al. |
| 5,472,481 A | | 12/1995 | Jones et al. |
| 5,480,547 A | | 1/1996 | Williamson et al. |
| 5,501,872 A | | 3/1996 | Allen et al. |
| 5,591,335 A | | 1/1997 | Barboza et al. |
| 5,605,706 A | | 2/1997 | Allen et al. |
| 5,618,566 A | | 4/1997 | Allen et al. |
| 5,667,562 A | | 9/1997 | Midkiff |
| 5,672,232 A | | 9/1997 | Clack |
| 5,681,469 A | | 10/1997 | Barboza et al. |
| 5,733,581 A | | 3/1998 | Barboza et al. |
| 5,800,706 A | | 9/1998 | Fischer |
| 5,913,851 A | | 6/1999 | Gryskiewicz et al. |
| 5,916,678 A | * | 6/1999 | Jackson et al. .............. 428/373 |
| 5,972,063 A | | 10/1999 | Dudrey et al. |
| 5,994,482 A | | 11/1999 | Georgellis et al. |
| 6,019,809 A | | 2/2000 | Kahlbaugh et al. |
| 6,114,017 A | | 9/2000 | Fabbricante et al. |
| 6,117,322 A | | 9/2000 | Miller et al. |
| 6,146,580 A | | 11/2000 | Bontaites, Jr. |
| 6,171,369 B1 | | 1/2001 | Schultink et al. |
| 6,179,890 B1 | | 1/2001 | Ramos et al. |
| 6,227,009 B1 | * | 5/2001 | Cusick et al. ................. 65/460 |
| 6,314,344 B1 | | 11/2001 | Sauer et al. |
| 6,315,805 B1 | | 11/2001 | Strauss |
| 6,342,283 B1 | | 1/2002 | Mozelack et al. |
| 6,358,417 B1 | | 3/2002 | Aune et al. |
| 6,387,144 B1 | | 5/2002 | Jaroszczyk et al. |
| 6,402,951 B1 | | 6/2002 | Wilson et al. |
| 6,422,396 B1 | | 7/2002 | Li et al. |
| 6,423,227 B1 | | 7/2002 | Allen et al. |
| 6,432,175 B1 | | 8/2002 | Jones et al. |
| 6,488,801 B1 | | 12/2002 | Bodaghi et al. |
| 6,521,555 B1 | | 2/2003 | Bodaghi et al. |
| 6,544,310 B2 | | 4/2003 | Badeau et al. |
| 6,613,268 B2 | | 9/2003 | Haynes et al. |
| 6,662,842 B2 | | 12/2003 | Mozelack et al. |
| 6,736,274 B2 | | 5/2004 | Tremblay et al. |
| 6,811,588 B2 | | 11/2004 | Niakin |
| 6,838,402 B2 | | 1/2005 | Harris et al. |
| 6,860,917 B2 | | 3/2005 | Henrichsen et al. |
| 6,872,431 B2 | | 3/2005 | Kahlbaugh et al. |
| 6,916,395 B2 | | 7/2005 | Aune et al. |
| 6,932,923 B2 | | 8/2005 | Nguyen |
| 6,938,781 B2 | * | 9/2005 | Aune et al. .................. 210/506 |
| 6,989,193 B2 | | 1/2006 | Haile et al. |
| 7,309,372 B2 | * | 12/2007 | Kahlbaugh et al. ............ 55/527 |
| 7,585,454 B2 | * | 9/2009 | Noga et al. .................. 264/555 |
| 2002/0046656 A1 | | 4/2002 | Benson et al. |
| 2002/0070471 A1 | | 6/2002 | Lee |
| 2002/0073667 A1 | | 6/2002 | Barris et al. |
| 2002/0092423 A1 | | 7/2002 | Gillingham et al. |
| 2002/0187701 A1 | | 12/2002 | Healey |
| 2003/0010002 A1 | | 1/2003 | Johnson et al. |
| 2003/0080464 A1 | | 5/2003 | Aune et al. |
| 2003/0116874 A1 | | 6/2003 | Haynes |
| 2003/0203696 A1 | | 10/2003 | Healey |
| 2005/0082238 A1 | | 4/2005 | Larson |
| 2006/0278574 A1 | | 12/2006 | Khan et al. |
| 2007/0039300 A1 | | 2/2007 | Kahlbaugh et al. |

FOREIGN PATENT DOCUMENTS

| | | |
|---|---|---|
| EP | 0428400 | 6/1995 |
| EP | 0682557 | 4/1997 |
| EP | 0616831 | 6/1999 |
| EP | 0960645 | 2/2000 |
| EP | 1270771 | 1/2003 |
| EP | 1198280 | 6/2003 |
| EP | 1173269 | 7/2003 |
| EP | 1050331 | 12/2003 |
| EP | 1133342 | 1/2004 |
| EP | 01048335 | 4/2005 |
| GB | 02015253 | 9/1979 |
| GB | 02194255 | 3/1988 |
| JP | 11-036169 | 2/1999 |
| PL | 1-172113 | 4/1995 |
| PL | 186112 | 9/1999 |
| WO | WO-95/13856 | 5/1995 |
| WO | WO-97/39817 | 10/1997 |
| WO | WO-00/29656 | 5/2000 |
| WO | WO-01/42549 | 6/2001 |
| WO | WO-02/20133 | 3/2002 |
| WO | WO-02/20668 | 3/2002 |
| WO | WO-2004/110592 | 12/2004 |

OTHER PUBLICATIONS

Tadeusz Jaroszczyk et al., "*Chapter 10 Cartridge Filtration*", in Filtration Principles and Practices, Second Edition, Revised and Expanded, Michael Matteson and Clyde Orr, eds., Marcel Dekker, Inc., New York, 1987, p. 547.

L. Spielman et al., "*Progress in Induced Coalescence and a New theoretical Framework for Coalescence by Porous Media*", Flow through Porous Media, R. Nunge, Chairman, ACS Publications, Washington, D.C., 1970.

L. Spielman et al., "*Theory of Coalescence by Flow through Porous Media*", Ind. Eng. Chem. Fundamentals, 11:66-72, 1972a.

L. Spielman et al., "*Experiments in Coalescence by Flow through Fibrous Mats*", Ind. Eng. Chem. Fundamentals, 11:73-83, 1972b.

L. Spielman et al., "*Coalescence in Oil-in-Water Suspensions by Flow Through Porous Media*", Ind. Eng. Chem. Fundamentals, 16:272-282, 1977.

\* cited by examiner

VARIABLE COALESCER

BACKGROUND AND SUMMARY

The invention relates to fibrous media coalescers, and more particularly to coalescers having variable properties.

Fibrous media coalescers are known in the prior art for coalescing and separating a medium having two immiscible phases, namely a continuous phase and a dispersed phase. For example: in engine crankcase ventilation systems, and other air-oil separation systems, the continuous phase is air, and the dispersed phase is oil; in fuel-water separation systems, such as fuel filters, fuel is the continuous phase, and water is the dispersed phase; in water-oil separation systems, water is the continuous phase, and oil is the dispersed phase. The invention is particularly well suited for engine crankcase ventilation applications, but may be used in other separation systems having immiscible fluids, e.g. air-oil, fuel-water, water-oil, etc.

The present invention arose during continuing development efforts directed toward coalescers and methods of making same.

DETAILED DESCRIPTION

Figure 1:
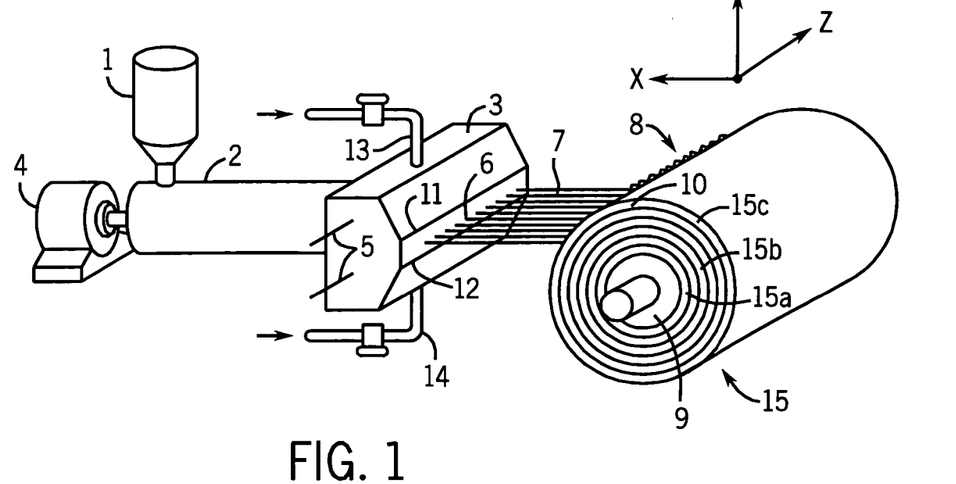
FIG. 1 is a schematic perspective view illustrating a method for making a coalescer in accordance with the invention.

In the preferred embodiment, the present system uses melt blowing techniques for making a coalescer in accordance with the invention. Melt blowing techniques for particulate filters are known in the prior art, for example U.S. Pat. No. 6,860,917, 3,755,527, incorporated herein by reference. Referring to FIG. 1, and also noting the description in incorporated U.S. Pat. No. 6,860,917, Col. 3, lines 25+, pellets of thermoplastic polymer, for example polyester, polypropylene, polyetherester, polyamide, polyurethane, polyphenylene sulfide, nylon, ethylene acrylic copolymer, polystyrene, polymethylmethacrylate, polycarbonate, silicones, polyethyleneter-phthalate, or blends or mixtures of these, are introduced into a pellet hopper 1 of an extruder 2. The thermoplastic polymer is forced through the extruder 2 into a die head 3 by a drive or melt pump 4. The die head 3 may contain heating means 5 which may control the temperature in the die head 3. The thermoplastic polymer is then forced out of a row of die openings 6, also known as spinnerets, in the die head 3 into a gas stream which attenuates the thermoplastic polymer into fibers 7 which are collected on a moving collecting device 8 such as a rotating mandrel or drum 9 to form a continuous web 10. The gas stream which attenuates the thermoplastic polymer is supplied through gas jets 11 and 12, for which further reference may be had to FIG. 2 of above noted incorporated U.S. Pat. No. 3,755,527. The gas slots 11 and 12 are supplied with a hot gas, preferably air, by gas lines 13 and 14. Reference is also made to U.S. Pat. No. 3,978,185, incorporated herein by reference, for showing a melt blowing process. Melt blowing includes processes sometimes called melt spinning and spun bonding. Typically, melt blown filter cartridges are made by extruding a polymer through orifices associated with a melt blowing die to form fibers which are directed toward a collector. During melt blowing, a flow of inert gas (e.g. air) acts on the molten fibers so as to attenuate the fibers to relatively fine diameter and to randomly distribute the attenuated fibers onto the collector. A mass of nonwoven, randomly intermingled solidified fibers builds up on the collector. Collector 8 provided by rotary mandrel 9 collects and rolls the fibers into an annular filter roll 15.

In one aspect, the present application provides a method for producing essentially continuous, long fibers of polymer with varying diameter by a melt blown process. The fibers are wound into a form of defined shape to produce the coalescer element with graded fiber diameter and porosity characteristics. The coalescer coalesces a medium having two immiscible phases, namely a continuous phase and a dispersed phase. The continuous phase flows from upstream to downstream. The coalescer element is provided by fibrous media capturing droplets of the dispersed phase, coaslescingly growing the droplets into larger drops which further coalesce and grow to form pools that drain. In one preferred embodiment, it is desirable for the coalescer media properties to vary as a function of depth. In coalescer applications such as crankcase ventilation coalescers, mist removal filters, fuel water coalescers, and oil water separators, it is desirable in one preferred embodiment for porosity and/or fiber diameter to decrease with increasing distance into the media, reaching a minimum at mid depth, i.e. somewhere between the upstream and downstream ends, and then for the porosity and/or fiber diameter to increase and become more open with further increasing distance into the media from mid depth to downstream, approaching the downstream face. This U-shaped profile is further described hereinafter, e.g. FIG. 3, providing decreasing fiber diameter and/or porosity from upstream to mid depth, and then increasing fiber diameter and/or porosity from mid depth to downstream. The decreasing porosity and fiber diameter results in lower restriction in the upstream portions of the coalescer. The minimum fiber diameter and/or porosity is where maximum removal efficiency is obtained. The subsequent increase in porosity and fiber diameter, proceeding from mid depth to downstream, facilitates drainage and release of captured droplets from the coalescer.

A variety of methods have been used to vary coalescer media properties as a function of depth. For example, different media layers can be stacked to obtain such effect. Coalescing filters, for example, are constructed of an inner, high efficiency coalescing layer, and an outer, coarser drainage layer. In some applications, multiple layers, e.g. perhaps as many as seven distinct layers, are used to achieve the noted benefits. Typically, this may be done by rolling or pleating different media sheets together in layers or by melt blowing, including melt spinning, different layers on top of one another. Each layer may consist of a different material to be obtained and handled in production. Each layer may require a different step and/or piece of equipment for handling and production. Transitions between layers tend to be abrupt or exhibit a step function change, which can result in corresponding discontinuities in fluid flow and may result in increased restriction and reduced life and capacity.

In one aspect of the present application, a method is provided for producing coalescer elements, including for crankcase ventilation and mist removal coalescers, and for other types of coalescers using fibrous coalescer media in which it may be desirable to vary fiber diameter and/or porosity as a function of depth into the coalescer. Fibers are created of essentially continuous length by melt blowing from a suitable thermoplastic polymer, for example those noted above. The fibers are collected onto a turning/spinning/rotating mandrel or other suitable collector of suitable cross-sectional shape, e.g. circular, oval, elliptical, racetrack, triangular, rectangular, diamond, trapezoidal, star-shaped and so on. In one aspect, the diameter of the individual fibers is varied as they are produced to create long fibers that have different diameters at different points along their length. In a further aspect, the diameter of the fibers is controlled as they are produced relative to the thickness of the coalescer media being formed on the mandrel in order to create a coalescer element with coalescer media properties, e.g. fiber diameter and/or porosity that vary as a function of depth. In another aspect, the collector, or mandrel, and the melt blowing die are moved relative to one another in a one, two or three dimensional manner.

FIG. 1 schematically illustrates the noted method. It shows a melt blowing process, including the noted hopper 1 containing the polymer pellets, the melt pump 4, the air lines 13, 14, the die 3, the mandrel 9, the fibers 7, and the formed coalescer element 15. Also illustrated is a three dimensional coordinate system having X, Y and Z axes orthogonal to each other, wherein the collector 8 provided by rotating mandrel 9 rotates about the Z axis and is spaced from die 3 along the X axis. The length of die 3 along the Z axis is typically less than that of element 15 in order to allow relative movement of die 3 and collector mandrel 9 during production of element 15 without significant overspray of the fiber 7. Fiber diameter along the length of the fiber is varied during production of the fiber by: varying the distance between the die and the collector/mandrel by moving the die and collector/mandrel relative to one another in the X and/or Y directions; and/or controlling the relative position of the die and the collector/mandrel to one another in the X, Y and Z directions; and/or controlling polymer throughput; and/or controlling air pressure and/or flow rate; and/or controlling mandrel speed, e.g. by moving the die and collector mandrel relative to one another in X, Y and/or Z directions and/or controlling mandrel rotation speed about the Z axis; and/or temperature of the polymer. These factors also affect the porosity and fiber orientation of the coalescer media. For example, by moving the relative positions of the die and collector back and forth in the Z direction, the orientation of fibers is reversed upon such change in direction of the collector or die. This creates a crossed pattern of interlocking fibers that increases the structural integrity of the resultant element, and facilitates drainage of coalesced liquid, for example as set forth in commonly owned co-pending U.S. patent application Ser. No. 11/230,694, filed Sep. 20, 2005, incorporated herein by reference.

Figure 2:
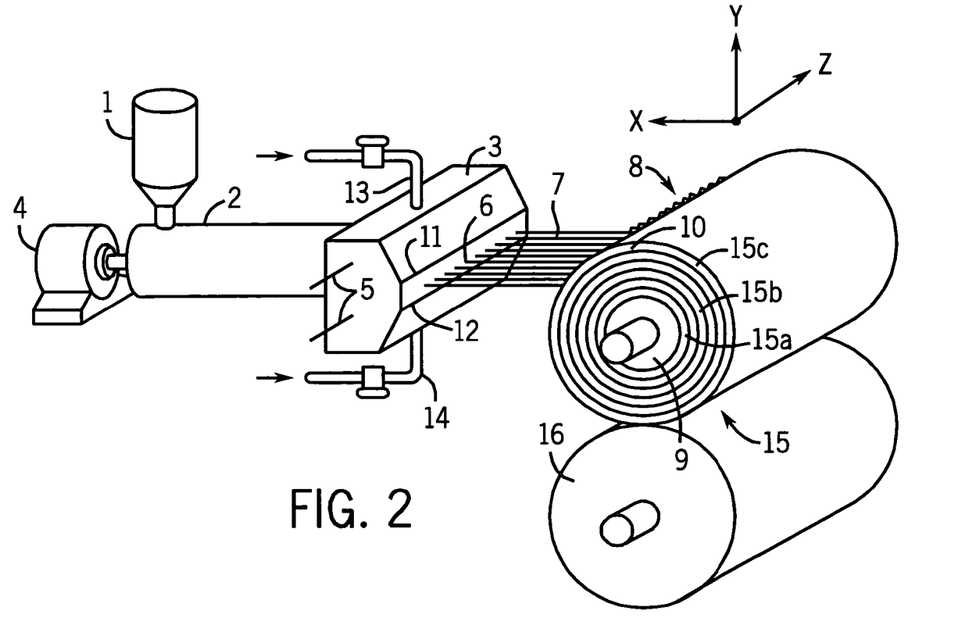
FIG. 2 is like FIG. 1 and shows a further embodiment.

Porosity can also be controlled by applying pressure to the media. FIG. 2 is like FIG. 1 and uses like reference numerals from above where appropriate to facilitate understanding. A method of controlling porosity is provided through the use of a compression roller 16. By controlled use of compression roller 16 to apply pressure on coalescer element 15 and by controlling the pressure/force with which compression roller 16 rolls against element 15, porosity can be controlled during element production. Fiber diameter and/or porosity is controlled as a function of depth without using different layers of different media providing composite or laminate structures.

Fiber diameter is also a function of the types of thermoplastic polymer introduced into the hopper. This can be used to advantage to create higher performance coalescer elements. For example, by mixing pellets of two or more different types of compatible polymers, for example two polyesters with different melting points, in the hopper, and melt blowing the resultant mixture, fibers of two or more different diameters, chemical and physical characteristics can be simultaneously melt blown and laid down at the same location with respect to depth in the element. If for example, the two polymers have different melting points, one will cool faster than the other, and the one with the lowest melting point will bond strongly to the other type and increase the overall strength and structural integrity of the media, while creating a bi-modal fiber diameter distribution, with the fiber diameter of each mode varied during fiber production. Similarly, restriction and removal, for example, can be optimized by blending a small percentage of a polymer that yields large diameter fibers with a higher percentage of a polymer that yields finer fibers. Alternatively, the structural integrity of the element, for example, can be increased by blending a small percentage of a polymer that yields large diameter strong fibers with a higher percentage of a polymer that yields finer fibers better suited to capture fine contaminants but lacking in structural integrity. Drainage of coalesced liquid from a coalescer and reduced restriction may be obtained by blending a relatively highly wetting polymer with a relatively non-wetting polymer. To further optimize coalescer media structure, one could vary the relative amounts of the different types of fibers as a function of depth by controlling the relative amounts of the different polymers in the hopper or being pumped to the die. The combinations produce elements particularly well suited for coalescer applications, including crankcase ventilation filters, mist removal filters, fuel water coalescers, and oil water separators. Such elements coalesce and remove contaminant droplets from the fluid stream. They achieve high removal efficiency, to facilitate drainage of coalesced liquid contaminant, to have high contaminant holding capacity and long service life.

As an example, in a first coalescer embodiment, fibers having at least a bi-modal fiber diameter distribution are wound in a roll as a single sheet but effectively providing multiple layers in an element roll 15 achieving a porosity which varies as a function of depth. The average diameter for the smaller fibers in the fiber distribution is in the range of 0.05 to 10 µm, depending on the efficiency requirements. The function of these fibers is to remove fine contaminant with high efficiency. The coarser fibers have diameters from 20 to 100 µm to facilitate drainage. These elements are made as depth type elements with a minimum thickness of 10 mm. In order to make the elements physically robust and simultaneously generate fibers of two different diameters, two different types of polymers are used, e.g. 95% PBT (polybutyleneterephthalate) polymer and 5% PET (polyethyleneterephthalate) polymer is used. The average fiber density is 1.38 grams per cubic meter, and the average element porosity is greater than 80%. The use in combination of fine and coarse fibers, i.e. an individual fiber with differing diameters at different points along its length, results in high efficiency, good drainage properties, and low droplet re-entrainment. The removal efficiency for a new element is greater than 90% for ultra fine oil mist and soot while testing on a diesel engine in application to crankcase ventilation. The droplet size of oil mist ranges from less than 0.03 µm to 10 µm, while an average diameter is in the range of 0.4 to 1.0 µm. An efficiency of greater than 80% is obtained, even for the oil saturated stage of the coalescing process.

Figure 3:
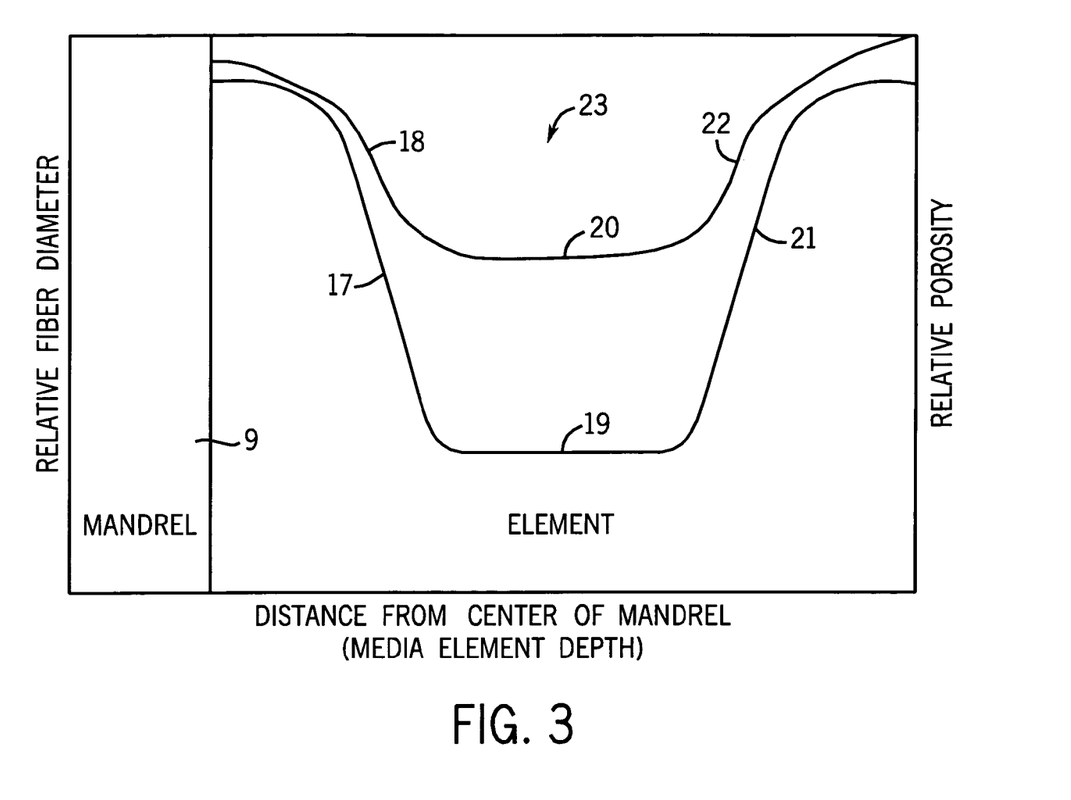
FIG. 3 is a graph illustrating coalescer characteristics in accordance with the invention.

In a second coalescer embodiment example, the same polymer mixture is used to achieve a bi-modal distribution, however the distance between the die and collector mandrel is decreased at the beginning of coalescer element production (e.g. near the center 15a of an annular element 15 adjacent the mandrel), then gradually increased near the middle of element production, e.g. mid depth 15b for the media, and then decreased again near the end of the element production, e.g. at the outer portion 15c of the annular element. This is achieved by moving the die 3 and mandrel 9 relative to one another in the X direction. Simultaneously, the die 3 and mandrel 9 may be moved relative to one another in the Z direction to achieve a desired fiber orientation. This results in an element structure with coarser fibers of both types near filter face 15a to facilitate removal of coarser contaminants, but not finer contaminants, at the upstream side of the element when used in an inside-out flow geometry. Fiber diameter is at a maximum at regions 15a and 15c, and is at a minimum at region 15b. Fiber diameter decreases from region 15a to 15b, and then increases from region 15b to region 15c. Porosity is at a maximum at regions 15a and 15c, and is at a minimum at region 15b. Porosity decreases from region 15a to region 15b, and then increases from region 15b to region 15c. Fiber diameter and porosity vary as a function of distance outwardly from mandrel 9, i.e. vary as a function of filter depth from region 15a to region 15b and from region 15b to region 15c. This is illustrated in FIG. 3 showing distance from the center of the mandrel along the abscissa or horizontal axis, which is the radial depth of the element 15, and showing along the ordinate or vertical axis the relative fiber diameter and relative porosity. The noted variance of fiber diameter and porosity decreasing from region 15a to 15b is shown at downward slopes 17, 18, and the fiber diameter and porosity at mid depth region 15b is shown at 19, 20, and the increasing fiber diameter and porosity from mid depth region 15b to downstream region 15c is shown at 21, 22, resulting in a U-shaped profile 23.

The noted U-shaped profile 23, FIG. 3, results in a net lowering of the total restriction across the coalescer element. The noted varying fiber diameter has a U-shaped profile 23 in a plot, FIG. 3, of element depth along the abscissa versus fiber diameter along the ordinate, with minimum fiber depth diameter at the bight 19 of the U at the noted mid depth 15b. Likewise, the noted varying porosity has a U-shaped profile in a plot of element depth along an abscissa versus porosity along an ordinate, with minimum porosity at the bight of the U at the noted mid depth 15b. Fiber diameter and porosity decrease from region 15a to region 15b where a minimum is achieved for both parameters at which point removal and restriction is highest. From this minimum, fiber diameter and porosity again increase from region 15b to region 15c to reduce restriction and facilitate drainage of captured coalesced liquid from the coalescer. The gradual change (i.e., the nonsawtooth changed) in both fiber diameter and porosity avoids the flow discontinuities and contaminant build-up discontinuities inherent in multi-media elements having different layers or sheets of different media material and/or different layers or sheets of different fiber diameter and/or different layers or sheets of different porosity. Instead, the gradual change in both fiber diameter and porosity in the present system, e.g. along the noted individual continuous fiber, eliminates step-change discontinuities and reduces restriction and increases service life of the coalescer. In a coalescer, capillary pressure holds the droplets in place. If a step-change is encountered, e.g. a large pore down to a small pore, then movement of the droplet is working against capillary pressure to get the droplet to move into the smaller pore, which significantly increases restriction. This undesirable characteristic is avoided in the present system by providing a gradual change, e.g. avoiding formation of different layers and trying to force droplets therethrough. For dispersed phase wetted media, this is particularly significant in the uphill portions 21, 22 of the noted U-shaped profile 23. For dispersed phase non-wetted media, this is particularly significant in the downhill portions 17, 18 of the noted U-shaped profile 23. The present system gradually varies the fiber diameter of the same such given individual fiber from a first diameter in a first annular region to a second diameter in a second annular region (e.g. from 15a to 15b and/or from 15b to 15c) to provide a gradual transition therebetween (i.e., a nonsawtooth transition therebetween), eliminating abrupt step function changes and corresponding discontinuities, including in fluid flow velocity and pressure drop characteristics, which otherwise increase restriction and reduce life and capacity.

The above examples note annular element rolls having a closed loop shape, e.g. circular, oval, elliptical racetrack, triangular, rectangular, diamond, trapezoidal, star-shaped, and so on. In some applications, packaging or other reasons may dictate other shapes or open shapes, such as flat panel configurations. These may be made from the noted closed loop annular shape by cutting or splitting the resultant element axially along a plane parallel to the axis of the annulus to provide a panel element or the like or otherwise obtain a desired cross-section.

In the present system, the diameter of individual fibers of the coalescer is controlled and varied along the length of the fiber. Fiber diameter, pore size and/or porosity are varied as a function of depth in the coalescer element and is accomplished using the same media and same media sheet, i.e. the same media and media sheet is used to obtain a wide range of properties. Fiber diameter, pore size and/or porosity may be varied continuously and gradually, eliminating the noted step-changes in media properties as a function of depth and avoiding the corresponding discontinuities in fluid flow velocity and pressure drop characteristics within the element, resulting in longer lasting elements. The noted gradual continuous changes may be achieved by varying and controlling the melt blown production parameters, including for example the distance between the die and mandrel/collector, the relative position of the die and mandrel to one another, polymer throughput, air pressure, flow rate, mandrel/collector speed, and temperature. Media properties as a function of depth may be varied and controlled by moving the die and collector relative to one another in the X, Y and/or Z directions. The system combines concepts to produce coalescers wherein fiber diameter, pore size and/or porosity vary as a function of depth giving performance advantages. There is no need to produce separate multiple layers in serial fashion, whether each layer is produced independently by different melt blowing machines and the unfinished element is transferred from machine to machine, or whether layering is accomplished by aligning multiple dies in serial fashion along the Z direction and continuously producing tubular elements that grow or progress in the same Z direction, with the finished element cut to length after the last die, with each die in the series producing a different layer with its own properties.

The present system provides a method of making a coalescer element 15 by melt blowing a plurality of polymer fibers 7 onto a collector 8, and during the melt blowing, varying the diameter of individual fibers along their length such that an individual fiber has differing diameters at different points along its length. Fibers 7 are melt blown from die 3 ejecting melted polymer through spinnerets 6 to produce the fibers. Fiber diameter is varied along the length of the fiber during fiber production. Collector 8 is spaced from die 3, and in one embodiment fiber diameter along the length of the fiber is varied during fiber production by varying the spacing between collector 8 and die 3. When collector 8 is a rotating mandrel 9 in such embodiment, fiber diameter is varied along the length of the fiber during fiber production by varying the relative position of die 3 and mandrel 9 relative to one another along at least one of the X and Y axes. In another embodiment, fiber diameter is varied along the length of the fiber during fiber production by varying polymeric throughput through spinnerets 6. Polymer is ejected through spinnerets 6 into a pressurized gas stream, as noted above, to produce fibers 7. In another embodiment, fiber diameter is varied along the length of the fiber during fiber production by varying at least one of the gas pressure and gas flow rate. In another embodiment when collector 8 is a rotating mandrel 9, fiber diameter is varied along the length of the fiber during fiber production by varying the speed of rotation of mandrel 9. In another embodiment, fiber diameter is varied along the length of the fiber during fiber production by varying the temperature of the melted polymer. In another embodiment, two polymers are used simultaneously in the die to produce a bi-modal fiber distribution, with fiber diameter of each mode being varied as above described. In one embodiment, the two polymers have different melting points. In the preferred embodiment of the noted methods, fiber diameter is varied along the length of the fiber during fiber production while the fibers are being melt blown from die 3.

When collector 8 is a rotating mandrel 9, the rotating mandrel collects and rolls fibers 7 into an annular element roll 15 having an inner region 15*a* at the mandrel, and having an outer region 15*c* spaced radially outwardly of inner region 15*a* by the radial thickness of the element roll. Element roll 15 has a depth dimension along such radial thickness. Fiber diameter is varied along the length of the fiber during fiber production such that fiber diameter varies as a function of element depth. In one embodiment, as noted, fiber diameter is varied along the length of the fiber during fiber production to provide a first annular region such as 15*a* of a first fiber diameter, and a second annular region such as 15*b* and/or 15*c* of a second fiber diameter different than the first fiber diameter and of the same individual melt blown fiber. An individual fiber is melt blown from die 3. Such individual fiber is rolled on mandrel 9 to form the noted first annular region. The same such given individual fiber is rolled on the first annular region to form a second annular region such as 15*b*, and the same such given individual fiber is further rolled on second annular region 15*b* to form a third annular region such as 15*c*, and so on as desired. The given individual fiber is rolled at the noted first diameter in first annular region 15*a*, then the fiber diameter of the same such given individual fiber is gradually varied to a second diameter, and then the same such given individual fiber is rolled at such second fiber diameter in second annular region 15*b*, and so on. The given individual fiber may be rolled in other annular regions in sequential steps but still rolling the same such given individual fiber, thus providing the noted continuity and gradual changes and avoiding the above noted step-change discontinuities. The change in diameter of the given individual fiber occurs gradually during melt blowing, and the change from region to region across the radial thickness and depth of the element is gradual.

One of the inner and outer regions 15*a* and 15*c* is at an upstream surface, and the other of the inner and outer regions 15*a* and 15*c* is at a downstream surface. The direction of flow is from upstream to downstream. For example, in an inside-out flow geometry, region 15*a* is at the upstream surface, and region 15*c* is at the downstream surface. In an outside-in flow geometry, outer region 15*c* is at the upstream surface, and inner region 15*a* is at the downstream surface. In one embodiment, as above noted, fiber diameter is varied along the length of the fiber during fiber production to vary fiber diameter as a function of element depth such that fiber diameter decreases with increasing depth into the element along the flow direction. Further in such embodiment, the fibers are rolled such that porosity also decreases with increasing depth into the element along the flow direction. In another embodiment, fiber diameter along the length of the fiber is varied during fiber production to vary fiber diameter as a function of element depth such that fiber diameter increases with increasing depth into the element along the flow direction. Further in such embodiment, the fibers are rolled such that porosity also increases with increasing depth into the element along the flow direction. In another embodiment, fiber diameter along the length of the fiber is varied during fiber production to vary fiber diameter as a function of element depth such that fiber diameter decreases with increasing depth into the element along the flow direction from upstream to mid depth 15*b*, and then increases with increasing depth into the element along the flow direction from mid depth 15*b* to downstream. These characteristics are shown in FIG. 3 at U-shaped profile 23. Further in such embodiment, the fibers are rolled such that porosity decreases with increasing depth into the element along the flow direction from upstream to mid depth 15*b*, and then increases with increasing depth into the element along the flow direction from mid depth 15*b* to downstream. Typically, fiber diameter and porosity follow the same increasing or decreasing trend with respect to element depth, however not necessarily. For example, an element may have decreasing fiber diameter while porosity increases, or vice versa.

The system further provides a method of making a coalescer by melt blowing a plurality of polymer fibers onto a collector, and during the melt blowing, controllably varying the porosity of the coalescer formed by the fibers, e.g. by varying fiber diameter as above described and/or by the noted rolling. In one embodiment, porosity decreases with increasing depth into the coalescer. In another embodiment, porosity increases with increasing depth into the coalescer. In another embodiment, porosity decreases with increasing depth into the coalescer from upstream to mid depth 15*b*, and then increases with increasing depth into the coalescer from mid depth 15*b* to downstream, FIG. 3. In a further embodiment, porosity is controllably varied by providing a compression roller 16 engaging and applying pressure against coalescer element roll 15 at the outer surface at region 15*c* during formation thereof. In a further embodiment, porosity is varied to provide a first annular region such as 15*a* of a first porosity, a second annular region such as 15*b* of a second porosity different than the first porosity and of the same individual melt blown fiber, and a third annular region such as 15*c* of a third porosity different than the first and/or second porosity and of the same individual melt blown fiber, and so on. A given individual fiber is melt blown from die 3. Such given individual fiber is rolled on mandrel 9 to form first annular region 15*a*, and the same such given individual fiber is rolled on first annular region 15*a* to form second annular region 15*b*, and so on.

The present system and method provides a coalescer having a plurality of melt blown fibers wherein the diameter of an individual fiber varies along the length of the fiber such that an individual fiber has differing diameters at different points along its length. Fiber diameter is varied along the length of the fiber to provide an individual fiber having differing diameters at different points along its length such that fiber diameter of such individual fiber varies as a function of coalescer depth. The coalescer has a first region such as 15*a* of a first fiber diameter, a second region such as 15*b* of a second fiber diameter different than the first fiber diameter and of the same individual melt blown fiber, and so on. As above noted, the change in fiber diameter is gradual to avoid the noted discontinuities and step-changes and the noted disadvantages inherent therein. In one embodiment, fiber diameter varies along the length of the individual fiber to vary fiber diameter as a function of element depth such that fiber diameter along the individual fiber decreases with increasing depth into the element. Further in such embodiment, porosity also preferably decreases with increasing depth into the element. In another embodiment, fiber diameter varies along the length of the individual fiber to vary fiber diameter as a function of element depth such that fiber diameter along the individual fiber increases with increasing depth into the element. In such embodiment, porosity also preferably increases with increasing depth into the element. In another embodiment, fiber diameter varies along the length of the individual fiber to vary fiber diameter as a function of element depth such that fiber diameter along the individual fiber decreases with increasing depth into the element from upstream to mid depth 15*b*, and then increases with increasing depth into the element from mid depth 15*b* to downstream, FIG. 3. In such embodiment, porosity preferably decreases with increasing depth into the element from upstream to mid depth 15*b*, and then increases with increasing depth into the element from mid depth 15*b* to downstream. The system provides a coalescer produced by the noted method of making a coalescer including melt blowing a plurality of polymer fibers onto a collector, and during the melt blowing, varying the diameter of individual fibers along their length such that an individual fiber has differing diameters at different points along its length.

The system and method also provides a coalescer having a plurality of melt blown fibers, with the coalescer having an upstream surface spaced from a downstream surface by a depth dimension therebetween, with the coalescer having a first depth region of a first porosity, and a second depth region downstream of the first depth region and of a second porosity different than the first porosity and of the same individual melt blown fiber of the first region. As above noted, the change is gradual to avoid the noted disadvantages of discontinuities or step-changes. In one embodiment, porosity decreases with increasing depth into the coalescer element. In another embodiment, porosity increases with increasing depth into the element. In another embodiment, porosity decreases with increasing depth into the element from upstream to mid depth 15*b*, and then increases with increasing depth into the element from mid depth 15*b* to downstream, FIG. 3. The system provides a coalescer produced by the noted method of making a coalescer by melt blowing a plurality of polymer fibers onto a collector, and during the melt blowing, controllably varying the porosity of the coalescer formed by the fibers.

It is expected that numerous of the above techniques may also be applied to particulate filters. For example, in a solids filter embodiment, the same polymer mixture may be used to achieve a bi-modal distribution, and the distance between the die 3 and mandrel 9 is increased at the beginning of element production at region 15*a*, then gradually decreased as the diameter of the element and the thickness of the media increases from region 15*a* to region 15*b* and 15*c*. As in the above example, this is accomplished by moving die 3 and mandrel 9 relative to one another in X and Z directions. This results in an element structure with finer fibers of both types in region 15*a* to facilitate the removal of fine particles at the downstream side of the element for outside-in flow geometry, and coarse particle and sludge removal by coarse fibers at the upstream side 15*c* in such outside-in flow geometry. Fiber diameter is at a minimum at region 15*a* and gradually increases to an increased fiber diameter at region 15*b* and continues to increase to a maximum fiber diameter at region 15*c*. Porosity is at a minimum at region 15*a* and increases to a higher porosity at region 15*b* and continues to increase to a maximum porosity at region 15*c*. Fiber diameter and porosity thus change as a function of distance from mandrel 9, i.e. as a function of radial thickness and filter depth dimension. This results in a net lowering of the total restriction across the filter element because restriction and efficiency gradually increase as the fluid penetrates further into the element. The gradual change in both fiber diameter and porosity avoids the flow and contaminant build-up discontinuities inherent in multi-media filters of multiple layers or sheets of different filter media of different fiber diameter and/or porosity. The noted gradual change eliminates step-change discontinuities and reduces restriction and increases service life.

It is recognized that various equivalents, alternatives and modifications are possible within the scope of the appended claims.

What is claimed is:

1. A method of making a coalescer comprising melt blowing a plurality of polymer fibers onto a collector, and during said melt blowing, varying the diameter of individual fibers along their length such that an individual fiber has differing diameters at different points along its length, wherein said fibers are melt blown from a die ejecting melted polymer through spinnerets to produce said fibers, and comprising varying fiber diameter along the length of the fiber during fiber production, and comprising a coordinate system having X, Y, Z axes orthogonal to each other, wherein said collector comprises a rotating mandrel rotating about said Z axis and spaced from said die along said X axis, and comprising varying fiber diameter along the length of the fiber during fiber production by varying the relative position of said die and said mandrel to one another along said Y axis.

2. A method of making a coalescer comprising melt blowing a plurality of polymer fibers onto a collector, and during said melt blowing, varying the diameter of individual fibers along their length such that an individual fiber has differing diameters at different points along its length, wherein said fibers are melt blown from a die ejecting melted polymer through spinnerets to produce said fibers, and comprising varying fiber diameter along the length of the fiber during fiber production, and comprising using two polymers simultaneously in said die to produce a bi-modal media fiber diameter distribution, with the fiber diameter of each mode varied during fiber production, wherein said two polymers have different melting points, and comprising a coordinate system having X, Y, Z axes orthogonal to each other, wherein said collector comprises a rotating mandrel rotating about said Z axis and spaced from said die along said X axis, and comprising varying fiber diameter along the length of the fiber during fiber production by varying the relative position of said die and said mandrel to one another along said Y axis.

3. A method of making a coalescer comprising melt blowing a plurality of polymer fibers onto a collector, and during said melt blowing, varying the diameter of individual fibers along their length such that an individual fiber has differing diameters at different points along its length, wherein said fibers are melt blown from a die ejecting melted polymer through spinnerets to produce said fibers, and comprising varying fiber diameter along the length of the fiber during fiber production, wherein said collector is a rotating mandrel collecting and rolling said fibers into an annular element having an inner surface at said mandrel, and having an outer surface spaced radially outwardly of said inner surface by the radial thickness of said element, said element having a depth along a depth dimension along said radial thickness, and comprising varying fiber diameter along the length of the fiber during fiber production such that fiber diameter varies as a function of said depth, and comprising varying fiber diameter along the length of the fiber during fiber production to provide a first annular region of a first fiber diameter, and a second annular region of a second fiber diameter different than said first fiber diameter and of the same individual melt blown fiber, and comprising melt blowing a given individual fiber from said die;

rolling said given individual fiber on said mandrel to form said first annular region;

rolling the same said given individual fiber on said first annular region to form said second annular region, and comprising rolling said given individual fiber at said first diameter in said first annular region, then varying fiber diameter of the same said given individual fiber to said second diameter, then rolling the same said given individual fiber at said second fiber diameter in said second annular region, and comprising gradually varying said fiber diameter of said same said given individual fiber from said first diameter in said first annular region to said second diameter in said second annular region to provide a gradual transition therebetween, eliminating abrupt step function changes and corresponding discontinuities, including in fluid flow velocity and pressure drop characteristics, which otherwise increase restriction and reduce life and capacity, and comprising a coordinate system having X, Y, Z axes orthogonal to each other, wherein said collector comprises a rotating mandrel rotating about said Z axis and spaced from said die along said X axis, and comprising varying fiber diameter along the length of the fiber during fiber production by varying the relative position of said die and said mandrel to one another along said Y axis.

4. A method of making a coalescer comprising melt blowing a plurality of polymer fibers onto a collector, and during said melt blowing, varying the diameter of individual fibers along their length such that an individual fiber has differing diameters at different points along its length, wherein said fibers are melt blown from a die ejecting melted polymer through spinnerets to produce said fibers, and comprising varying fiber diameter along the length of the fiber during fiber production, wherein said collector is a rotating mandrel collecting and rolling said fibers into an annular element having an inner surface at said mandrel, and having an outer surface spaced radially outwardly of said inner surface by the radial thickness of said element, said element having a depth along a depth dimension along said radial thickness, and comprising varying fiber diameter along the length of the fiber during fiber production such that fiber diameter varies as a function of said depth, wherein one of said inner and outer surfaces is an upstream surface, and the other of said inner and outer surfaces is a downstream surface, and wherein the direction of flow is from upstream to downstream, and comprising varying fiber diameter along the length of the fiber during fiber production to vary fiber diameter as a function of said depth such that fiber diameter decreases with increasing depth into said element along said flow direction from upstream to mid depth, and then increases with increasing depth into said element along said flow direction from mid depth to downstream, and comprising varying fiber diameter along a U-shaped profile in a plot of element depth along an abscissa versus fiber diameter along an ordinate, with minimum fiber diameter at the bight of the U at said mid depth, the transitions along said U-shaped profile, including the ends of the U and the bight of the U, being nonsawtooth, gradual transitions, eliminating abrupt step function changes and discontinuities, including in fluid flow velocity and pressure drop characteristics, which otherwise increase restriction and reduce life and capacity, and comprising a coordinate system having X, Y, Z axes orthogonal to each other, wherein said collector comprises a rotating mandrel rotating about said Z axis and spaced from said die along said X axis, and comprising varying fiber diameter along the length of the fiber during fiber production by varying the relative position of said die and said mandrel to one another along said Y axis.

5. A method of making a coalescer comprising melt blowing a plurality of polymer fibers onto a collector, and during said melt blowing, varying the diameter of individual fibers along their length such that an individual fiber has differing diameters at different points along its length, wherein said fibers are melt blown from a die ejecting melted polymer through spinnerets to produce said fibers, and comprising varying fiber diameter along the length of the fiber during fiber production, wherein said collector is a rotating mandrel collecting and rolling said fibers into an annular element having an inner surface at said mandrel, and having an outer surface spaced radially outwardly of said inner surface by the radial thickness of said element, said element having a depth along a depth dimension along said radial thickness, and comprising varying fiber diameter along the length of the fiber during fiber production such that fiber diameter varies as a function of said depth, wherein one of said inner and outer surfaces is an upstream surface, and the other of said inner and outer surfaces is a downstream surface, and wherein the direction of flow is from upstream to downstream, and comprising varying fiber diameter along the length of the fiber during fiber production to vary fiber diameter as a function of said depth such that fiber diameter decreases with increasing depth into said element along said flow direction from upstream to mid depth, and then increases with increasing depth into said element along said flow direction from mid depth to downstream, and comprising rolling said fibers such that porosity decreases with increasing depth into said filter along said flow direction from upstream to mid depth, and then increases with increasing depth into said filter along said flow direction from mid depth to downstream, and comprising varying porosity along a U-shaped profile in a plot of element depth along an abscissa versus porosity along an ordinate, with minimum porosity at the bight of the U at said mid depth, the transitions along said U-shaped profile, including the ends of the U and the bight of the U, being nonsawtooth, gradual transitions, eliminating abrupt step function changes and discontinuities, including in fluid flow velocity and pressure drop characteristics, which otherwise increase restriction and reduce life and capacity, and comprising a coordinate system having X, Y, Z axes orthogonal to each other, wherein said collector comprises a rotating mandrel rotating about said Z axis and spaced from said die along said X axis, and comprising varying fiber diameter along the length of the fiber during fiber production by varying the relative position of said die and said mandrel to one another along said Y axis.

6. A method of making a coalescer comprising melt blowing a plurality of polymer fibers onto a collector, and during said melt blowing, varying the diameter of individual fibers along their length such that an individual fiber has differing diameters at different points along its length, wherein said fibers are melt blown from a die ejecting melted polymer through spinnerets to produce said fibers, and comprising varying fiber diameter along the length of the fiber during fiber production, wherein said collector is a rotating mandrel collecting and rolling said fibers into an annular element having an inner surface at said mandrel, and having an outer surface spaced radially outwardly of said inner surface by the radial thickness of said element, said element having a depth along a depth dimension along said radial thickness, and comprising varying fiber diameter along the length of the fiber during fiber production such that fiber diameter varies as a function of said depth, wherein one of said inner and outer surfaces is an upstream surface, and the other of said inner and outer surfaces is a downstream surface, and wherein the direction of flow is from upstream to downstream, and comprising rolling said fibers such that porosity decreases with increasing depth into said element along said flow direction from upstream to mid depth, and then increases with increasing depth into said element along said flow direction from mid depth to downstream, and comprising varying porosity along a U-shaped profile in a plot of element depth along an abscissa versus porosity along an ordinate, with minimum porosity at the bight of the U at said mid depth, the transitions along said U-shaped profile, including the ends of the U and the bight of the U, being nonsawtooth, gradual transitions, eliminating abrupt step function changes and discontinuities, including in fluid flow velocity and pressure drop characteristics, which otherwise increase restriction and reduce life and capacity, and comprising a coordinate system having X, Y, Z axes orthogonal to each other, wherein said collector comprises a rotating mandrel rotating about said Z axis and spaced from said die along said X axis, and comprising varying fiber diameter along the length of the fiber during fiber production by varying the relative position of said die and said mandrel to one another along said Y axis.

\* \* \* \* \*